United States Patent [19]

Chini

[11] 4,340,999

[45] Jul. 27, 1982

[54] METAL CLASP

[75] Inventor: Mario Chini, Arezzo, Italy

[73] Assignee: Fratelli Chini Egidio & Mario S.N.C., Laterina, Italy

[21] Appl. No.: 169,342

[22] Filed: Jul. 16, 1980

[30] Foreign Application Priority Data

Jan. 18, 1980 [IT] Italy ................................ 1205/79[U]

[51] Int. Cl.³ ........................................... A44B 13/02
[52] U.S. Cl. ..................................... 24/241 P; 24/233
[58] Field of Search .................... 24/241 P, 233, 235, 24/241 PP, 241 PL, 241 SP, 241 SB, 234

[56] References Cited

U.S. PATENT DOCUMENTS

| | | | |
|---|---|---|---|
| 495,237 | 4/1893 | Wilson | 24/233 |
| 606,997 | 7/1898 | Mehl | 24/235 |
| 896,666 | 8/1908 | Rosson | 24/241 P |
| 1,417,949 | 5/1922 | Sleeper | 24/241 P X |
| 2,544,147 | 3/1951 | Evans | 24/233 |
| 2,986,788 | 6/1961 | Hasek | 24/241 SP X |
| 3,317,972 | 5/1967 | Harley | 24/241 P |
| 3,952,382 | 4/1976 | Vaage | 24/234 X |

FOREIGN PATENT DOCUMENTS

| | | | |
|---|---|---|---|
| 46962 | 11/1910 | Australia | 24/241 SP |
| 601962 | 3/1926 | France | 24/233 |
| 966655 | 10/1950 | France | 24/233 |

Primary Examiner—Roy D. Frazier
Assistant Examiner—Peter A. Aschenbrenner
Attorney, Agent, or Firm—Collard Allison C.; Thomas M. Galgano

[57] ABSTRACT

A metal clasp includes an outer housing made of a sheet of metal foil folded about its notched center portion so as to define a generally U-shaped housing having two opposed surface portions defining lateral openings therebetween. The clasp additionally includes a generally C-shaped element having two arched portions, one of which terminates in a flat end which is normally disposed to the axis of the element and the other of which terminates in a bevelled end which is obliquely directed towards the center of curvature of the associated arched portion. This C-shaped element is mounted in one lateral opening defined between the two surface portions of the housing and an elongated latching bar is introduced into the other lateral opening thereof. The latching bar is pivotably supported at one end and has an opposite free end which terminates in an oblique surface complementing the bevelled end of the other arched portion. The latching bar is spring-loaded so that the oblique surface thereof is urged against the bevelled surface of the arched portion to thereby substantially close the opening between the ends of the C-shaped element.

7 Claims, 4 Drawing Figures

METAL CLASP

The present invention relates to a metal clasp or lock particularly useful for gold, silver and costume jewelry. More particularly, it relates to a clasp, preferably made by stamping or shearing and therefore one which is easily fabricated and which has at the same time a rather wide surface on which names and other matters may be engraved, thus eliminating the need of auxiliary plates.

According to the invention, a lock is provided which terminates at its ends with two arches, one of which is intended to be opened so as to permit insertion of the last link of a chain, bracelet or similar article and thereafter closed to effect locking thereof. The lock is substantially fabricated from a sheet of metal foil sheared in a substantially rectangular form with a centrally-disposed notched portion corresponding to the point where it will be folded so as to define a generally U-shaped outer housing.

The space in-between the folded surfaces is closed on one side by a thin profile, element or rod of square or rectangular cross section, which is curved at its ends in order to form two arcuate sections or arches. The other side is closed by a second profile, element or rod of identical cross section to the first rod which is hinged at one end to the main foil by means of a suitable pin which allows pivoting thereof.

One of the arches of the first element ends at the corresponding point of the fold line of the foil which forms the outer housing of the lock while the other arch with an oblique end surface terminates at a suitable distance from the spaced-apart ends of the folded foil.

The second element can only move inwardly relative to the folded foil because its free end terminates in an oblique surface which, when pushed towards the outside of this foil, will contact the same oblique angled surface of the end of the second arch of the other rectangular element.

A pin spring, housed inside of the folded foil and hinged to a dowel, has two arms which act on the surfaces of the two rectangular elements facing each other, thus pushing the mobile element towards the outside and pressing the oblique surface thereof against the corresponding surface of the fixed element, thereby closing the arch.

The clasp is opened by pushing the mobile element towards the inside of the folded foil against the force of the internally-disposed spring. In order to facilitate this operation, the folded foil is provided on the sides adjacent the mobile element with two opposing indents.

The inward pivoting of the mobile element effects opening of the arch so as to allow the introduction into, or release from, the inner part of this arch, the terminal rings or links of a chain, bracelet or other article to which this clasp or lock is applied.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

In the drawing, wherein similar reference characters denote similar elements throughout the several views.

Figure 1:
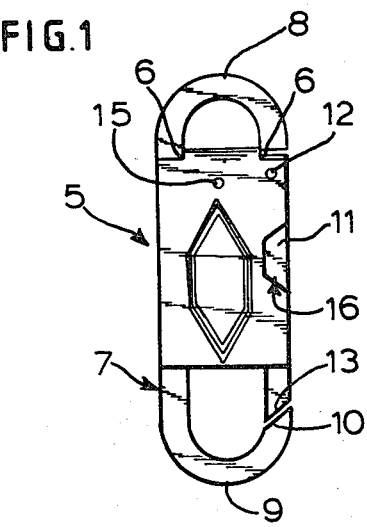
FIG. 1 is a front elevational view of a clasp embodying the present invention.
Figure 2:
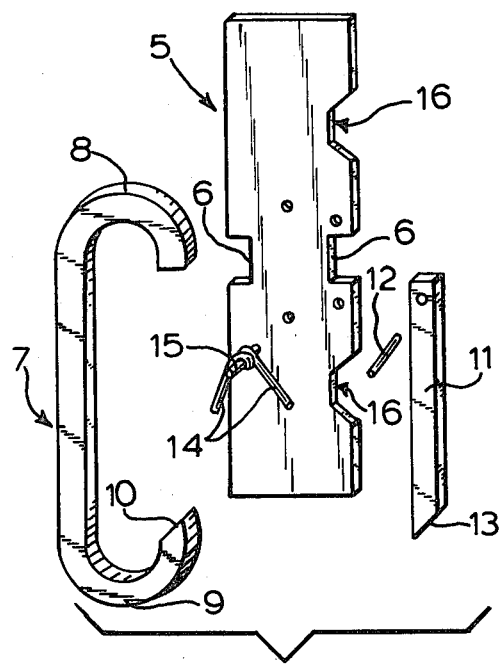
FIG. 2 is an exploded perspective view of the components of the lock, showing the metal foil which constitutes the clasp outer housing prior to folding into its intended final shape.
Figure 3:
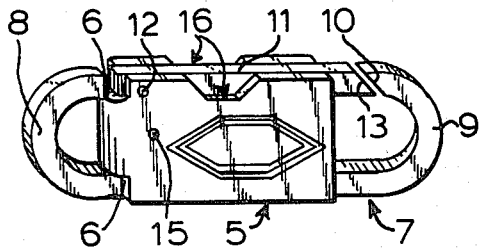
FIG. 3 is a perspective view of the clasp.
Figure 4:
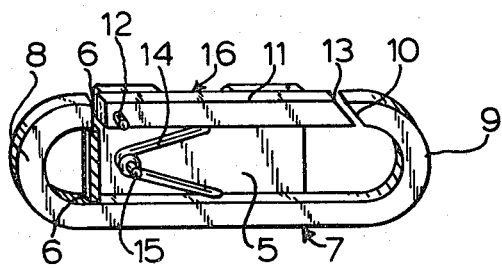
FIG. 4 is a perspective view similar to that of FIG. 3 but with half of the outer housing removed in order to show its internal construction and, in particular, the action of the pin spring.

Referring now in detail to the drawing, a sheared, generally rectangular foil sheet 5 has indentations formed therein about which the sheet is folded so as to assume the shape of a box which constitutes the outer housing of the clasp or lock.

One long side of this box will be closed by a thin elongated bar 7 of preferably square or rectangular cross section, which is preferably produced by shearing. The ends of bar 7 are bent to form arches 8 and 9, the latter of which terminates in an oblique cut or bevel 10, and is spaced at a suitable distance from the adjoining ends of foil 5.

Arch 8 terminates adjacent to the central folded part of foil 5 in order to be eventually bent sidewards to introduce an end link or terminal of a chain, bracelet or similar article to which the clasp will be applied while, however, preventing its escape when put back into its working position as shown in the drawing.

A latch 11 is pivotally mounted at one end between the two opposing surfaces of foil 5 by means of pin 12 and is spring-loaded with spring pin 14 mounted on a pin 15. The outward pivoting of latch 11 under the force of spring pin 14 hinged on pin 15 is, however, prevented by the oblique surface 10 against which the terminal bevelled surface 13 of the opposite end of latch 11 engages; this represents the locked position, with opening of the clasp being effected by applying a downward external force on latch 11.

The notches 16, symmetrically-disposed with respect to the central part of foil 5 allow easy and facile operation of latch 11, in order to introduce or release the free end of the chain, bracelet or other similar article to which the lock is applied.

The outer surfaces of the foil can have a plain, knurled or embossed finish and many configurations and forms are useful in order to obtain aesthetic harmony in applying the clasp to a specific intended article.

Thus, while only one embodiment of the present invention has been shown and described, it will be obvious that many changes and modifications may be made thereunto, without departing from the spirit and scope of the invention.

What is claimed is:

1. A metal jewelry clasp comprising:
an outer housing made of a single sheet of metal foil folded about a fold line at its center portion which is narrower relative to the remaining portion thereof so as to define a generally U-shaped housing having two opposed surface portions defining two opposite, lateral openings therebetween; and
a pair of cooperating clasp elements comprising a C-shaped element mounted in a fixed manner between said opposed surface portions of said U-shaped housing and disposed to close one of said lateral openings and an elongated, spring-loaded latching bar pivotably mounted at one end thereof between said opposed surface portions of said U-shaped housing and disposed to normally extend generally between the ends of said C-shaped element and to normally close the other of said lateral openings.

2. The metal clasp according to claim 1, wherein said housing is formed by shearing said sheet of metal foil.

3. The metal jewelry clasp according to claim 1, wherein said C-shaped element has a rectilinear main portion and two arched portions extending outwardly from said housing in opposite directions, one of which terminates in a flat end which is normally disposed to the axis of said main portion and the other of which terminates in a bevelled end which is obliquely directed towards the center of curvature of the associated arched portion.

4. The metal clasp according to claim 3, wherein said flat end of said one arched portion is nearly aligned with the fold line of said foil while the bevelled end of the other arched portion is spaced from the ends of said foil and wherein said one arched portion is shorter than said other arched portion.

5. The metal jewelry clasp according to claim 4, wherein said latching bar has an opposite free end which terminates in an oblique surface complementing said bevelled end of said other arched portion, which oblique surface, due to said latching bar being spring-loaded is urged against the bevelled surface of said other arched portion to thereby substantially close the opening between the ends of said C-shaped element.

6. The metal jewelry clasp according to claim 5, wherein said pin spring for spring-loading said latching bar has windings which are coiled about a pivot pin extending between the two surface portions of the U-shaped housing and said pin also has two arms which cooperate to push said latching bar outwardly.

7. The metal clasp according to claim 6, wherein said two surfaces of said folded foil have indentations formed in opposing lateral edges thereof so as to facilitate inward pivoting of the latching bar upon manual depression thereof so as to thereby open the arched portion and allow the introduction into or withdrawal therefrom of a terminal ring to which the clasp is to be applied.

* * * * *